(12) United States Patent
Miyamoto et al.

(10) Patent No.: US 8,335,035 B2
(45) Date of Patent: Dec. 18, 2012

(54) MULTI COLOR DISPLAY PANEL AND METHOD FOR MANUFACTURING THE SAME

(75) Inventors: Takashi Miyamoto, Tokyo (JP); Ryuji Doi, Tokyo (JP); Tomoyuki Syukunami, Tokyo (JP); Fumihiko Nakatsu, Tokyo (JP)

(73) Assignee: Toppan Printing Co., Ltd. (JP)

( * ) Notice: Subject to any disclaimer, the term of this patent is extended or adjusted under 35 U.S.C. 154(b) by 95 days.

(21) Appl. No.: 13/052,003

(22) Filed: Mar. 18, 2011

(65) Prior Publication Data

US 2012/0236391 A1    Sep. 20, 2012

(51) Int. Cl.
- G02B 26/00 (2006.01)
- G09G 3/36 (2006.01)
- G09G 3/34 (2006.01)

(52) U.S. Cl. .......... 359/296; 359/900; 345/88; 345/107

(58) Field of Classification Search .......... 359/290, 359/295, 296, 900; 345/30, 48, 50, 84, 87, 345/88, 105, 107

See application file for complete search history.

(56) References Cited

U.S. PATENT DOCUMENTS

| | | | |
|---|---|---|---|
| 6,947,202 B2 * | 9/2005 | Liang et al. | 359/296 |
| 8,064,126 B1 * | 11/2011 | Miyamoto et al. | 359/296 |
| 8,169,691 B1 * | 5/2012 | Miyamoto et al. | 359/296 |

FOREIGN PATENT DOCUMENTS

| | | |
|---|---|---|
| JP | 50-15115 | 2/1975 |
| JP | 2002-365668 | 12/2002 |
| JP | 2003-156770 | 5/2003 |
| JP | 2003-161964 | 6/2003 |
| JP | 2003-295234 | 10/2003 |

OTHER PUBLICATIONS

"Brief explanation of JP-B-S50-15115" in English as made by applicants.

* cited by examiner

*Primary Examiner* — Jack Dinh (74) *Attorney, Agent, or Firm* — Squire Sanders (US) LLP (57) ABSTRACT

One embodiment of the present invention is a multi-color display panel, including: a transparent substrate, a color filter layer, a transparent electrode layer, a microcapsule layer, an adhesive layer, a rear electrode plate, wherein the transparent substrate, the color filter layer, the transparent electrode layer, the microcapsule layer the adhesive layer and the rear electrode plate are arranged in this order, the microcapsule layer is directly formed on the transparent electrode layer, the microcapsule layer has a structure in which microcapsules are dispersed in a binder resin, a dispersion liquid in which an electrophoresis particle is dispersed in a transparent dispersion medium is enclosed in the microcapsule, and an optical reflection property of the microcapsule changes according to a change of electric field by application of a voltage, and wherein the electrode plate has a rear substrate with a pixel electrode.

6 Claims, 4 Drawing Sheets

MULTI COLOR DISPLAY PANEL AND METHOD FOR MANUFACTURING THE SAME

BACKGROUND OF THE INVENTION

1. Field of the Invention

The present invention is related to a microcapsule type electrophoresis display panel and is related to a multi-color display panel and a method for manufacturing the panel, the panel having a structure in which a pair of electrode plates, the plates facing each other and one of the plates being transparent, sandwiches a microcapsule, and an electrophoresis ink is enclosed in the microcapsule.

2. Description of the Related Art

In recent years, due to the development of information devices, various information displays are also being developed. A CRT or a liquid crystal using a backlight are main stream display panels of variable information, However, when a light emitting type display such as a CRT or a liquid crystal display using a backlight is watched for a long time, the human has becomes strained. Therefore, such a display is not suitable for reading a document or the like for a long time.

In addition, a screen in a liquid crystal display without a backlight becomes very dark due to the use of a polarizing plate which reduces visibilty. Further, a display image of these displays does not have memory characteristics. If an electric energy supply is stopped, a display image suddenly disappears. Therefore, a display which does not cause eye strain, has excellent visibility, low power consumption, and images having memory characteristics, is required.

As a reflection type display device which rarely causes eye strain, for example, an electrophoresis type display panel is proposed as shown in patent document 1, the electrophoresis display panel having a pair of mutually facing electrodes and an electrophoresis display layer arranged between the electrodes. This electrophoresis type display panel displays a character or an image by reflection light. This principle is the same as in printed paper. Therefore, the display panel rarely causes eye strain and is suitable for viewing for long periods.

The principle of this electrophoresis display panel is as follows. A voltage is applied to a dispersion liquid in which an electrically charged particle is dispersed. Thereby, the charged particle moves, and image display becomes possible. A microcapsule type electrophoresis display panel in which a colored charged particle is enclosed in a microcapsule and the microcapsule is arranged between a pair of mutually facing electrodes has advantages such as low driving voltage and high flexibility and is in being used practically and continuously developed.

This electrophoresis panel is suitable as a substitute for a display of an information portable device such as a PDA (personal digital assistance) or an electronic book which are predicted to be used widely, or a printed matter such as a newspaper, a book, a magazine and a poster, or displaying a hard copy on paper from a printer. The electrophoresis panel generally has a structure of two color displays (white and black display). However, in recent years, multi-color colorization is required for the purpose of displaying the magazine or a color printed matter.

In order to realize a multi-color colorization of the electrophoresis panel, the following ideas are disclosed. For example, using an electrophoresis particle of multi-color equal to or more than two colors, the particle is arranged in a predetermined pixel by patterning using photolithography (patent document 2) or by photolithograph and ink-jet (patent document 3). In addition, in patent document 4, a cell frame for receiving a microcapsule is formed in advance, and a plurality of microcapsules are arranged in a desirable position, thereby display of a plurality of colors becomes possible. However, arranging multi-color microcapsules at a predetermined pixel requires more processes and is complex. Therefore, there are actually many technological difficulties.

Therefore, in patent document 5, a color filter substrate is attached to a white and black electrophoresis display panel. Thereby, it is possible to display multi colors without accurate position adjustment between a microcapsule and a pixel. However, in this method, because a separately manufactured color filter is attached on a white and black reflection type electrophoresis display panel, it is necessary to arrange an adhesive for the attachment. Therefore, display brightness is low and attachment of a color filter is difficult which reduces productivity.

Further, because the distance between a color filter layer and an electrophoresis display layer is large there is a disparity in color depending on the viewing angle. An advantage of electronic paper which is not influenced by the viewing angle disappears. In order to resolve the above problem, a color filter is optimized which improves display brightness and viewing angle. However, significant improvement is not achieved.

Patent document 1: JP-B-S50-015115
Patent document 2: JP-A-2002-365668
Patent document 3: JP-A-2003-156770
Patent document 4: JP-A-2003-295234
Patent document 5: JP-A-2003-161964

The present invention was made in view of the above. In a multi-color display microcapsule type electrophoresis display panel, a conventional white and black microcapsule type electrophoresis display panel is overlapped with a color filter. Thereby, colorization becomes possible and problems of reduction of display brightness or narrowing of a view angle are resolved. The purpose of the present invention is to provide a multi-color display panel and a method for manufacturing the panel, the panel having the above advantage.

SUMMARY OF THE INVENTION

A first aspect of the present invention is a multi-color display panel, including: a transparent substrate; a color filter layer, a transparent electrode layer, a microcapsule layer, an adhesive layer, and a rear electrode plate, wherein the transparent substrate, the color filter layer, the transparent electrode layer, the microcapsule layer the adhesive layer and the rear electrode plate are arranged in this order, the microcapsule layer is directly formed on the transparent electrode layer, the microcapsule layer has a structure in which microcapsules are dispersed in a binder resin, a dispersion liquid in which an electrophoresis particle is dispersed in a transparent dispersion medium is enclosed in the microcapsule, and an optical reflection property of the microcapsule changes according to a change of electric field by application of a voltage, and wherein the electrode plate has a rear substrate with a pixel electrode.

A second aspect of the present invention is the multi-color display panel according to the first aspect, wherein the electrophoresis particle is two kinds of particles having different surface electrical charges, one being a colored particle and the other being a white particle.

A third aspect of the present invention is the multi-color display panel according to the first aspect, wherein a flattening layer is formed on the microcapsule layer in order to reduce bumps of the microcapsules.

A fourth aspect of the present invention is a method for manufacturing a multi-color display panel, the method including: (a) forming a color filter layer on a transparent substrate; (b) forming a transparent electrode layer on the color filter layer; (c) forming a microcapsule layer on the transparent electrode layer by a microcapsule ink in which a microcapsule is dispersed in a binder resin, wherein a dispersion liquid in which an electrophoresis particle is dispersed in a transparent dispersion medium is enclosed in the microcapsule, and an optical reflection property of the microcapsule changes according to a change of an electric field by application of a voltage; (d) forming an adhesive layer on the microcapsule layer; and (e) attaching the microcapsule layer to a pixel electrode surface of a rear electrode plate in which a pixel electrode is arranged on a rear substrate through the adhesive layer.

A fifth aspect of the present invention is the method for manufacturing the multi-color display panel according to the fourth aspect, the method further comprising forming a flattening layer in order to reduce bumps of the microcapsule ink.

A sixth aspect of the present invention is the method for manufacturing the multi-color display panel according to the fourth aspect, wherein forming the adhesive layer on the microcapsule layer includes forming an adhesive sheet on the microcapsule layer wherein the adhesive sheet is a peeling type resin substrate on which a conductive layer is formed and to which an adhesive is applied, and evaluating driving of the microcapsule layer when a voltage is applied between the transparent electrode layer and the conductive layer, the method further comprising peeling and removing the peeling type resin substrate with the conductive layer before attaching the microcapsule layer to the pixel electrode surface of the rear electrode plate.

1 . . . a transparent substrate, 2 . . . a color filter layer, 4 . . . a transparent electrode layer, 5 . . . a microcapsule, 6 . . . a colored particle, 7 . . . a white particle, 8 . . . a transparent dispersion medium, 9 . . . a microcapsule shell, 10 . . . a microcapsule layer, 11 . . . a binder resin, 16 . . . an adhesive layer, 17 . . . a peeling layer, 18 . . . a conductive layer, 19 . . . a peeling substrate, 20 . . . an adhesive sheet, 30 . . . a pixel electrode, 41 . . . PET, 50 . . . a rear substrate.

DETAILED DESCRIPTION OF THE INVENTION

Hereinafter, a multi-color display panel and a method for manufacturing the panel is explained in detail based on an embodiment.

Figure 1:
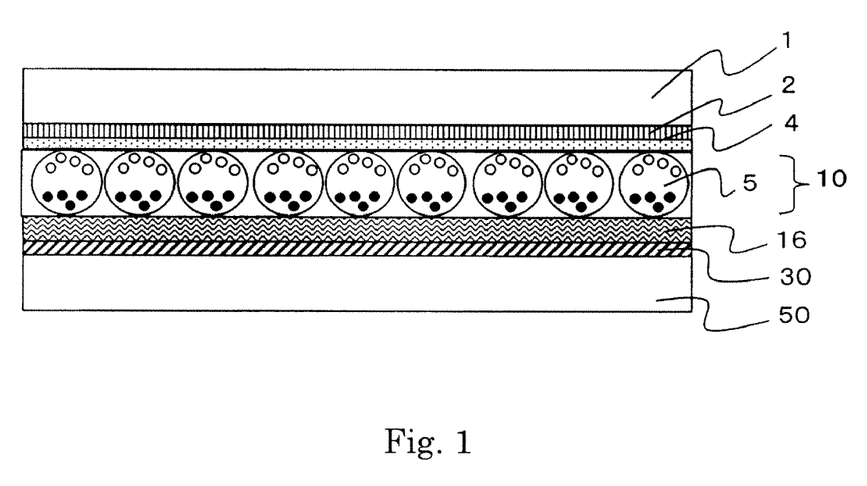
FIG. 1 is a schematic cross section diagram explaining a structure of a multi-color display panel related to one embodiment of the present invention.
Figure 2:
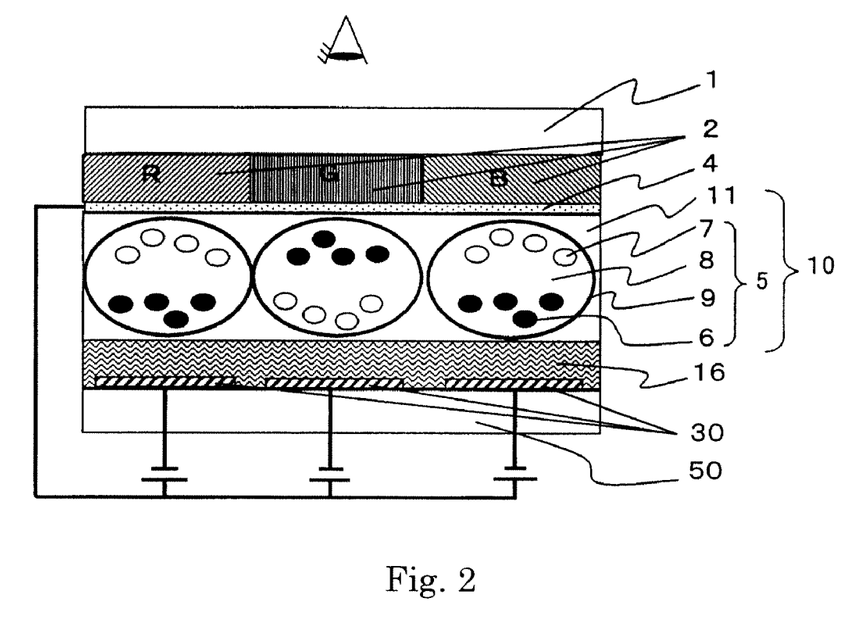
FIG. 2 is a schematic enlarged cross section diagram explaining a structure of a multi-color display panel related to one embodiment of the present invention.
Figure 3:
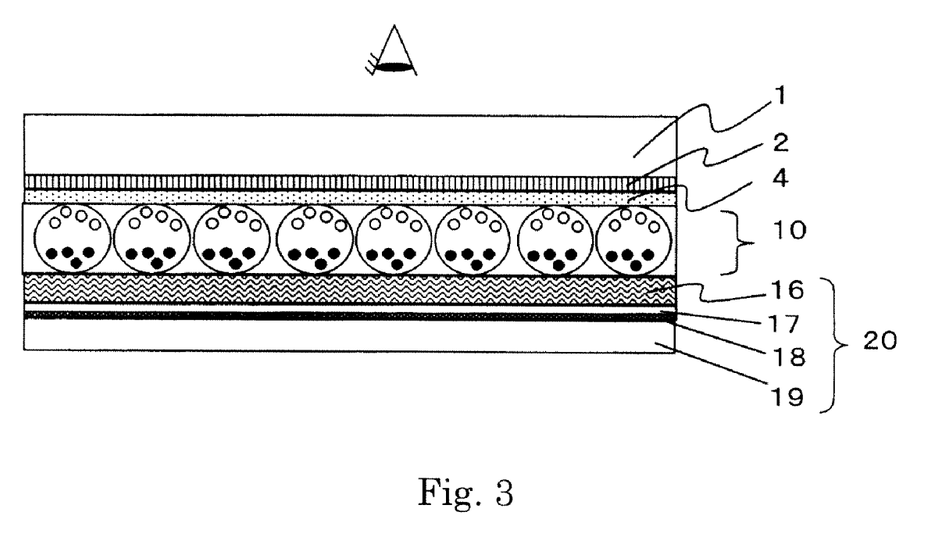
FIG. 3 is a schematic diagram explaining an example of a structure of a panel in an intermediate process of a method for manufacturing a multi-color display panel of the present invention.

FIG. 1 is a schematic cross sectional diagram explaining an example of a structure of a multi-color display panel related to one embodiment of the present invention. FIG. 2 is a schematic diagram explaining the structure by using an enlarged cross section view. As shown in FIG. 1 and FIG. 2, a cross section structure of a multi-color display panel of the present invention has a color filter layer (2) and a transparent electrode layer (4) on a transparent substrate (1). In addition, a microcapsule layer (10) is directly formed on the transparent electrode layer (4). Here, in the microcapsule layer (10), a microcapsule (5) is dispersed in a binder resin (11), and a dispersion liquid in which an electrophoresis particle is dispersed in a transparent dispersion medium is enclosed in the microcapsule. An optical reflection property of the microcapsule (5) changes depending on a change of an electric field when a voltage is applied. A rear electrode plate including a rear substrate (50) with a pixel electrode (30) is attached to the microcapsule layer (10) through an adhesive layer (16).

In addition, (not shown in figures) according to necessity, in order to reduce bumps of a microcapsule (5), a surface flattening layer (an over coat of only a binder resin) is provided on a microcapsule layer (10).

A glass plate or a resin plate is used for a transparent substrate (1). For example, soda-lime glass, low-alkali borosilicate glass or alkali-free alumino-borosilicate glass can be used as the glass plate, For example, polyethylene terephthalate (PET), polycarbonate, polyimide, polyethylenenaphthalate, polyethersulfone, acrylic resin or polyvinyl chloride can be used as the resin plate.

In a multi-color display panel of the present invention, the shape of a pattern of a color filter layer is not especially limited and a preferred shape can be appropriately used. For example, a filter segment of a fine stripe shape in which the segments are parallel to each other or intersect with each other can be used. Alternatively, a filter segment in which the filter segments are arranged in a matrix in a plane can also be used. In a color filter layer (2) used in the present invention, a plurality of colored patterns are arranged and colored pixels are arranged in respective pixel regions. A colored pixel colors transmission light for every pixel. Generally, colored pixels of red (R), green (G) and blue (B) which correspond to light's three primary colors or of yellow (Y), magenta (M) and cyan (C) of three primary colors are arranged.

This color filter layer is generally manufactured as follows. A colored light sensitive resin or a transparent light sensitive resin, the colored light sensitive resin being a light sensitive resin in which a color agent of a pigment or a dye is dispersed or mixed, is applied to a glass substrate by a spin coating method or a spinless coating method so as to have a uniform thickness. Any excess solvent is dried and removed. (photolithography). Thereafter, this resist film is irradiated with an active energy beam using an ultrahigh pressure mercury lamp by a proximity exposure through a photo mask of a desirable shape. Thereby, a curing level (a negative type) or alkali solubility (a positive type) is increased. Parts which can be dissolved by an alkali solution or the like are removed, thereby development is performed. Further, post-baking is performed. These operations are repeated several times which as needed. In addition, the present invention is not especially limited to the above manufacturing method.

Then, according to necessity, the surface of the color filter layer (2) is polished and flattened. Thereafter, a transparent electrode layer (4) is formed. For example, a transparent conductive oxide of indium oxide system, tin oxide system, zinc oxide system such as ITO can be used as a material of the transparent electrode. A conventional technology such as vaporization method, sputtering method or CVD method can be used for forming this transparent electrode.

Hereinafter, a summary of the display principles of a color filter with a microcapsule which constitutes a multi-color display panel of the present invention is explained.

As shown in FIG. 2, a pixel electrode (30) of a rear substrate (50) is connected to a switching element (not illustrated) of each pixel electrode. Thereby a positive and negative voltage can be applied between a pixel electrode and a transparent layer (4). In order to display an image, usually, the pixel electrode (30) is connected to a power source of a circuit constitution of an active matrix driving type. When a voltage is applied to the pixel electrode (30), an electric field in the microcapsule layer (10) changes. When the pixel electrode (30) is a positive electrode, a negative charged particle in a microcapsule (5) moves toward a side of the pixel electrode (30) of a rear surface, and a positive charged particle moves towards a side of the transparent electrode layer (4) of a front surface. Similarly, when the pixel electrode (30) is a negative electrode, a positive charged particle moves towards a side of a pixel electrode, and a negative charged particle moves towards a side of the transparent electrode layer (4). Here, if, for example, a black particle has a positive charge and a white particle has a negative charge, the display color is the color of a particle which moves towards a side of the transparent electrode layer (4) of a front surface. Therefore, light from an observer side is reflected by the particle, and the reflected light passes through a color pattern of an opposing color filter, thereby the color of a desirable character or image can be displayed.

Next, a material and a component used for a multi-color display panel of the present invention are further explained.

The microcapsule (5) used for forming a microcapsule with a color filter is comprised of a colored particle (6), a while particle (7), a transparent dispersion medium (8) and a microcapsule shell (9).

Generally, a microcapsule used for a microcapsule type electrophoresis display panel is refined by a bolting method, a gravity separation method or the like. Its average diameter is 30-100 μm. Furthermore, the proportion of a microcapsule having a capsule with a diameter within 10 μm with respect to an average diameter of the microcapsule is more than 50%. The microcapsule used for a multi display panel of the present invention is the same.

A water type solvent such as alcohol is used for a microcapsule dispersion liquid. If there is no particular problem then water is used.

A transparent dispersion medium (8) is selected from an insulating liquid in which an electrically charged particle can be properly and stably electric charged, that is, an organic solvent which is substantially insoluble in water. For example, aliphatic hydrocarbon, aromatic hydrocarbon, alicyclic hydrocarbon, halogenated hydrocarbon, various ester, alcohol system solvent, or other fat is used. A mixed material thereof is also used.

An inorganic pigment such as an inorganic carbon, a fine powder such as glass and resin, and a composite body thereof are used for a colored particle (6). In addition, in a multi-color display panel of the present invention which displays a multi-color by a color filter, a black particle using carbon black is usually used.

A white inorganic pigment such as well-known titanium oxide, silica, alumina and zinc oxide, an organic compound such as vinyl acetate emulsion, and a composite body thereof are used for a white particle (7).

According to necessity, a surface of the colored particle (6) and white particle (7) is treated by using various surfactant agents, dispersing agents, organic compounds, inorganic compounds, metals or the like. Thereby, the surface can have a surface charge, and dispersing stability in a transparent dispersion medium (8) can be improved.

A dispersion liquid A in which the colored particle (6) and the white particle (7) are dispersed in a transparent dispersion medium (8) is enclosed in a microcapsule using a well-known method such as a phase separation method of a complex coacervation, an interfacial polymerization method, an in-situ method and a hotmelt microencapsulation method. A microcapsule shell (9) is, for example, a film of rubber or gelatin.

A microcapsule ink is prepared by mixing a microcapsule dispersion liquid with a viscosity improver, surfactant agent, a binder resin (11) or the like, the microcapsule dispersion liquid having a dispersed refined microcapsule having a different diameter distribution.

A dielectric resin such as polylactic acid, phenol resin, polypropylene resin, acrylic resin, and polyurethane resin is used for a binder resin (11) of a microcapsule ink.

In addition, in the case where, inks are mixed after microcapsule inks of two or more kinds are prepared, the inks to be mixed are adjusted to have the same density in order to prevent ink density from changing after mixing the inks.

The microcapsule layer (10) is formed as follows. The microcapsule ink is, as mentioned above, directly applied to the transparent electrode layer (4) of a transparent substrate made of a glass substrate or a resin substrate on which the color filter layer (2) and the transparent layer (4) are formed in advance. Application is performed by an application apparatus such as a screen printing type, a micro gravure coater, a kiss coater, a comma coater, a die coater, a bar coater and a curtain coater.

As mentioned above, the manufactured microcapsule layer (10) has a surface with bumps. Therefore, a distance between electrodes sandwiching a microcapsule cell does not easily become constant. Therefore, it is preferred that a surface flattening layer is formed by applying a surface flattening ink to the microcapsule layer (10). When a surface flattening layer is formed, an adhesive can be directly applied to the surface flattening layer. In the case where an adhesive is directly applied without a flattening layer, if a non-applied spot exists such as a pin hole in the microcapsule layer (10), an adhesive directly contacts with the transparent electrode layer (4) in a side of a color filter, thereby a dielectric constant changes. Therefore, it is difficult for a voltage to be applied to a microcapsule. As a result, display becomes unclear.

In the surface flattening ink, a resin as a binder is dispersed in a solvent. It is preferable that a binder component thereof has a dielectric constant which is equal to a dielectric constant of a resin of a binder component used for a microcapsule ink or a binder component used for an adhesive. It is most preferable that binder resin components of a microcapsule ink, an adhesive layer and a surface flattening ink are identical.

If resins having different dielectric constants are used, resins having different constants are arranged between electrodes. Further, thicknesses of respective resins differ according to a size of a microcapsule at this part. In this case, a voltage applied to a microcapsule does not easily become uniform over the entire region of a screen.

A solvent used for a microcapsule ink can be used for a solvent of a surface flattening ink. However, a water system solvent such as alcohol may be also used.

Application of a surface flattening ink is performed by using an application apparatus such as a curtain coater and a slot die coater. An application type which cuts an application liquid of a blade coater or the like can not be used because it breaks the microcapsule inside the microcapsule layer.

It is preferable that a thickness of the surface flattening layer is 10-30 μm. In the case where the thickness is lower than 10 μm, bumps of a surface of the microcapsules can not be flattened. On the other hand, in the case where the thickness is more than 30 μm, a distance between electrodes becomes long. This causes an increase in the driving voltage.

As mentioned above, a surface flattening layer is formed and a solvent is sufficiently vaporized. Thereby, a color filter with a microcapsule is formed. This color filter with a microcapsule is attached to a rear electrode plate in which a pixel electrode is arranged on a rear substrate, through an adhesive layer, while position adjustment between a colored pattern (a pixel) of a color filter and a pixel electrode of a rear electrode is performed. Thereby, an electrophoresis type multi-color display panel can be manufactured.

It is preferable that a synthetic resin type adhesive such as an urethane resin type adhesive and an acrylic resin type adhesive is used. Especially, an adhesive using a resin having a high dielectric constant is preferable.

It is possible to directly apply an adhesive to the microcapsule layer or the pixel electrode. However, in the manufacturing method of the present invention, an adhesive using the same component as a binder resin used for the microcapsule ink is applied to a resin peeling substrate in which a conductive layer is formed between a silicon film and a resin substrate. A resin peeling substrate with an adhesive is preferably used as an adhesive sheet. When an adhesive having a component which is the same as a binder resin used for a microcapsule ink is used, an affinity with the interface of a resin is increased and thereby peeling does not easily occur. In addition, dielectric constants are similar to each other and therefore a voltage applied to a microcapsule becomes uniform over the entire surface.

In addition, if a resin peeling substrate in which a conductive layer is formed between a silicon film and a resin substrate is used, the following merit is obtained. A multi layer substrate in which the adhesive sheet is formed on a color filter with a microcapsule, a so-called color filter electrophoresis display type front plate, can be subjected to a driving evaluation and quality confirmation. In addition, a conductive layer used here does not have to be transparent, and the following films may be used. A thin film on which a metal such as copper and aluminum is deposited or electrodeposited, and a film to which a conductive polymer is applied can be used.

In a multi-color display panel of the present invention, a microcapsule layer is directly formed on a transparent electrode layer on a color filter layer. Thereby a microcapsule layer is very near a color filter layer, which is a surface of a display. As a result, if the present invention is compared with a conventional display panel which is formed by attaching a microcapsule layer to a color filter substrate which is manufactured separately, an unnecessary layer such as adhesive is not arranged between a microcapsule layer and a color filter layer in a structure of the present invention. Therefore, light reflected by a microcapsule layer passes a minimum layer and thereby display brightness is improved compared with the conventional display panel.

In addition, if a color filter layer is separated from a microcapsule layer, a gap between a display of a microcapsule layer and a color filter is observed. If a color filter layer is closely-attached to a microcapsule, the disparity (gap) is not observed, thereby narrowing of a viewing angle does not occur.

In addition, in a multi-color display panel of the present invention, a flattening layer is formed by coating only a binder resin of a microcapsule ink over a microcapsule layer and thereby bumps of a microcapsule ink are reduced. Therefore, it becomes possible to directly apply an adhesive. Thereby, the occurrence of display defects due to contact between an adhesive and a transparent electrode layer are prevented. This leads to improvements in reliability and productivity. Further, since a uniform voltage is applied to a microcapsule, there is uniform display, and the display quality of an image is improved. Further, according to a method for manufacturing a multi-color display panel of the present invention, an adhesive sheet is used in a process where an adhesive layer is formed on a microcapsule layer, the adhesive sheet having a peeling resin substrate with a conductive layer, and an adhesive is applied to the peeling resin substrate. Therefore, before the final multi-color display panel is manufactured by stacking a TFT substrate or the like, a driving evaluation of a microcapsule layer becomes possible and this is a preferable embodiment in view of quality confirmation.

EXAMPLE

Hereinafter, specific examples of the present invention are explained.

Example 1

A titanium oxide powder (a white powder) of 3 μm average diameter, the surface of which was covered by a polyethylene resin, and a carbon black powder (a black powder) of 4 μm average diameter, the surfaces of which are treated by alkyl trimethylammonium chloride, were dispersed in a transparent dispersion medium of tetrachloroethylene. Thereby a dispersion liquid A was prepared. In this case, a white particle was charged negative, and a black particle was charged positive.

Next, a water solution in which gelatin and sodium polystyrene sulfonate were dissolved in water was prepared. The water solution was mixed with the dispersion liquid A. The mixed liquid was adjusted to 40 degrees Celsius. Thereafter, the mixed liquid was stirred by a homogenizer while the temperature of the mixed liquid was maintained. Thereby an O/W emulsion was obtained.

Next, the O/W emulsion and a water solution in which gum arabic was dissolved in water were mixed by a dispenser at 40 degrees Celsius. The pH of the solution was adjusted to 4 using acetic acid while the temperature of the solution was maintained at 40 degree Celsius. A microcapsule having a gelatin/acacia shell material was formed by a complex coacervation method.

Further, the temperature of the solution was reduced to 5 degree Celsius. Thereafter, a formalin solution (37 wt %) was added and thereby a wall material of a microcapsule shell was hardened. Thereby, a microcapsule was obtained in which the dispersion liquid in which a white particle (titanium oxide) and a black particle (a carbon black particle) were dispersed was enclosed.

The microcapsule obtained in this way was bolted and the particle diameter of the microcapsule was made uniform so that the average diameter of the particle was 60 μm and the proportion of microcapsules of 50-70 μm diameter was equal to or more than 50%.

Next, a microcapsule with a uniform diameter was used as a solid content. A water dispersion liquid having 40 wt % of the solid content was prepared. A microcapsule ink was manufactured by mixing the water dispersion liquid with an urethane system binder having 25 wt % of solid content (CP-7050, a product of DIC), a surfactant agent, a viscosity improver, and a pure water.

On the other hand, a color filter was manufactured by the following method. Here, "part" means "parts by weight". Firstly, acrylic resin was manufactured by copolymerizing 50 parts of butyl methacrylate, 20 parts of methyl methacrylate and 30 parts of acrylic acid wherein cyclohexane is used as a solvent.

An acrylic resin solution was prepared using 25 parts of the acrylic resin and 47 parts of a solvent. 20 parts of red pigments (Pigment Red 22) was mixed with the acrylic resin solution. This was dispersed for 1 hour by using a bead mill. Thereafter, 4 parts of dipentaerythritol and 4 parts of hexaacrylate as a light sensitive monomer, and 0.3 parts of bis(2,4,6-trimethylbenzoyl)-phenyl phosphine oxide as a photopolymerization initiator were mixed by a disperser. Thereby, a red color photo resist material was prepared.

This red color photo resist material was applied to a transparent glass substrate by a spin coating method. The coated glass was left for 5 minutes at a room temperature and a film surface was flattened. Thereafter, the coated glass was dried for 20 minutes at 70 degrees Celsius and a red color photo resist layer was formed.

Then, a photo mask was closely attached to the red color photo resist layer and was contact-exposed by an ultrahigh pressure mercury lamp under a condition of 150 mJ/cm$^2$ (exposure amount). Here, the photo mask had a stripe pattern corresponding to an exposure part of 100 mm (vertical)×110 µm (horizontal), the stripe pattern repeating through a light shielding part of 280 µm (lateral).

After the exposure, a spray development in which 1% of sodium carbonate solution was sprayed under 1 kg/cm$^2$ of pressure was performed for 20 seconds and the non-exposed part was removed and a glass substrate was exposed.

The glass substrate was dried after the developing process. Thereafter, the glass substrate was heated for 1 hour at 230 degrees Celsius, a film hardening process was performed, and a red color pattern of 1.1 µm film thickness was obtained.

Next, a green photo resist layer was formed on a glass substrate with this red color pattern. Here, a green pigment (Pigment Green 7) was used as a colorant, and a green photo resist material which was formed using the same composition as the red photo resist was used.

Then, a photo mask similar to the above photo mask was arranged at a position which was shifted 130 µm in a horizontal axis direction from a position where the red pattern was formed. Then, a contact exposure was performed under a condition of 200 mJ/cm2 (exposure amount).

After the exposure, a spray development in which 1% of sodium carbonate solution was sprayed under 1 kg/cm$^2$ of pressure was performed for 30 seconds, the non-exposed part was removed and a glass substrate was exposed.

Similarly, the glass substrate was dried after the developing process. Thereafter, the glass substrate was heated for 1 hour at 230 degrees Celsius, a film hardening process was performed, and a green color pattern of 1.2 µm film thickness was obtained.

Further, similarly, a blue pigment (Pigment Blue 15:6) was used as the colorant, a blue color photo resist was formed, and a blue pattern of 1.1 µm film thickness was obtained.

In this way, a color filter layer of three color patterns was formed on a glass substrate, and a transparent electrode layer of ITO was formed on the entire surface of the color filter layer.

Next, the microcapsule ink was applied to the transparent electrode layer on the transparent glass substrate which includes the color filter layer and the transparent electrode layer, using a slot die coater. After application, the ink was dried for 10 minutes at 60 degrees Celsius and a color filter with a microcapsule was obtained.

Further, a surface flattening ink including urethane binder with a 25% solid content (CP-7050, a product of DIC) was applied to the microcapsule layer of the color filter with the microcapsule using a slot die coater. The ink was dried and a color filter with a microcapsule on which a surface flattening layer was arranged was obtained.

Alternatively, aluminum of 100 nm thickness was deposited on one surface of a polyethylene terephthalate sheet of 50 µm thickness. Further, a silicon type peeling coat layer was arranged on the aluminum. A polyester-urethane system adhesive was applied to a surface of the silicon type peeling coat layer to 20 µm and an adhesive sheet was prepared.

The adhesive sheet was attached to the color filter with the microcapsule with the surface flattening layer and a color filter electrophoresis display type front plate was obtained. Next, while the polyester-urethane system adhesive was left on the front plate, the polyethylene terephthalate of 50 µm thickness with the silicon type peeling coat was peeled from the front plate. While position adjustment using a position determining mark of the color filter was performed, the front plate with only the adhesive was attached to a surface of a pixel electrode of a rear electrode plate with the pixel electrode of ITO which had a circuit constitution of an active matrix driving type using a thin film transistor on a glass (a TFT substrate), wherein 0.50 MP of pressure was applied to the attachment. Thereby, a microcapsule type electrophoresis display panel with a color filter of the present invention was obtained.

Comparative Example 1

Figure 4A:
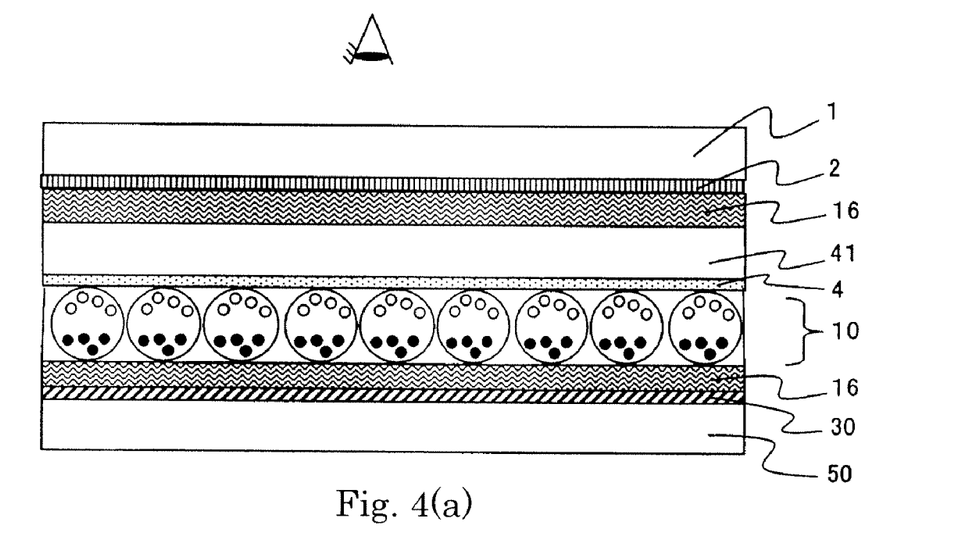
FIG. 4 is a schematic cross section diagram explaining a structure of a conventional multi-color display panel.
Figure 4B:
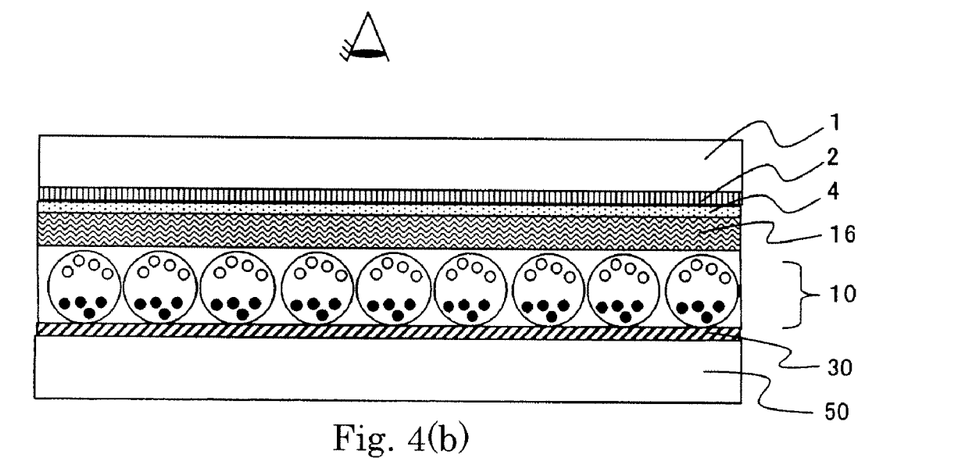

The microcapsule ink which was used in Example 1 was applied to a surface of an ITO of a polyethylene terephthalate sheet (41) of 50 µm thickness of which one surface had a transparent electrode layer (4) of ITO, using a slot die coater. After application, the ink was dried for 10 minutes at 60 degree Celsius and a microcapsule type electrophoresis layer was obtained. A surface flattening layer was arranged on this microcapsule type electrophoresis layer by the same method as Example 1. By using the adhesive sheet in Example 1, the microcapsule type electrophoresis layer was attached to a surface of a pixel electrode of a rear electrode plate with the pixel electrode of ITO which had a circuit constitution of an active matrix driving type using a thin film transistor on a glass, wherein 0.50 MP of pressure was applied to the attachment. Thereby, a microcapsule type electrophoresis display panel was obtained. Next, while position adjustment using the position determining mark of the color filter was performed, the color filter layer manufactured in Example 1 in which three color patterns were formed on the glass substrate was attached to the TFT substrate used in Example 1, wherein the TFT substrate was attached to a side of the polyethylene terephtharate, using the adhesive sheet in Example 1. Thereby, a microcapsule type electrophoresis display panel with a color filter of Comparative Example 1 was obtained.

Comparative Example 2

The microcapsule ink used in Example 1 was applied to a surface of a pixel electrode of a rear electrode plate with the pixel electrode of ITO which had a circuit constitution of an active matrix driving type using a thin film transistor on a glass (a TFT substrate), using a slot die coater. After application, the ink was dried for 10 minutes at 60 degree Celsius and a microcapsule type electrophoresis layer with the TFT substrate was obtained. A surface flattening layer was arranged on the microcapsule type electrophoresis layer with the TFT substrate, using the same method as Example 1. Further, a side of a transparent layer of a substrate which included a color filter layer and a transparent electrode layer on a transparent glass substrate which was manufactured in Example 1 was attached to the surface flattening layer on the microcapsule type electrophoresis layer with the TFT substrate, using the adhesive sheet used in Example 1. Thereby, a microcapsule type electrophoresis display panel with a color filter of Comparative Example 2 was obtained.

A voltage of about ±15 V was applied between the transparent electrode of the front surface and the pixel electrode of the rear surface of the display panels of Example 1 and Comparative Examples 1 and 2 using a standard voltage/current generator (a product of YOKOKAWA). Actual display properties were evaluated. In addition, reflectances in cases of color display (white display) and black display were measured using a color difference meter (CR-400, a product of Konica Minolta), thereby contrast was evaluated. Here, contrast=reflectance in the case of a color display (white display)/reflectance in the case of a black display. Further, visual lightness L* was measured by using the meter.

As a result, in the display panels of Example 1 and Comparative Examples 1 and 2, the distance between a transparent electrode layer and a pixel electrode layer was basically identical. A black particle and a white particle in any of the displays moved alternately between both electrodes according to the direction of an electric field when a voltage was applied. Therefore, multi displays with almost identical contrast could be realized. However, in the display panels of Comparative Examples 1 and 3, the distance between a color filter layer and a microcapsule layer is large compared with that in the display panel of Example 1. Moreover, display brightness becomes low when a viewing angle from a front surface becomes large due to optical non-uniformity of a PET film and an adhesive layer. Further, large color shift was generated between observations of a front surface and a horizontal direction in the display panels of Comparative Example 1 and 2. Thereby, the viewing angle becomes very narrow. However, in the multi display panel of Example 1 of the present invention, disparity of color depending on viewing angle was also improved and thus excellent color display was possible.

(The disclosure of Japanese Patent Application No. JP2009-217149, filed on Sep. 18, 2009, is incorporated herein by reference in its entirety.)

What is claimed is:

1. A multi-color display panel, comprising:
    a transparent substrate;
    a color filter layer;
    a transparent electrode layer;
    a microcapsule layer,
    an adhesive layer; and
    a rear electrode plate,
    wherein
    the transparent substrate, the color filter layer, the transparent electrode layer, the microcapsule layer, the adhesive layer and the rear electrode plate are arranged in this order, the microcapsule layer is directly formed on the transparent electrode layer, the microcapsule layer has a structure in which microcapsules are dispersed in a binder resin, a dispersion liquid in which an electrophoresis particle is dispersed in a transparent dispersion medium is enclosed in the microcapsule, and an optical reflection property of the microcapsule changes according to a change of an electric field by application of a voltage, and the electrode plate has a rear substrate with a pixel electrode.

2. The multi-color display panel according to claim 1, wherein the electrophoresis particle is two kinds of particles having different surface electric charges, one being a colored particle and the other being a white particle.

3. The multi-color display panel according to claim 1, wherein a flattening layer is formed on the microcapsule layer in order to reduce bumps of the microcapsules.

4. A method for manufacturing a multi-color display panel, the method comprising:
    (a) forming a color filter layer on a transparent substrate;
    (b) forming a transparent electrode layer on the color filter layer;
    (c) forming a microcapsule layer on the transparent electrode layer by a microcapsule ink in which a microcapsule is dispersed in a binder resin, wherein a dispersion liquid in which an electrophoresis particle is dispersed in a transparent dispersion medium is enclosed in the microcapsule, and an optical reflection property of the microcapsule changes according to a change of an electric field by application of a voltage;
    (d) forming an adhesive layer on the microcapsule layer; and
    (e) attaching the microcapsule layer to a pixel electrode surface of a rear electrode plate in which a pixel electrode is arranged on a rear substrate through the adhesive layer.

5. The method for manufacturing the multi-color display panel according to claim 4, the method further comprising:
    forming a flattening layer in order to reduce bumps of the microcapsule ink.

6. The method for manufacturing the multi-color display panel according to claim 4, wherein forming the adhesive layer on the microcapsule layer includes forming an adhesive sheet on the microcapsule layer wherein the adhesive sheet is a peeling type resin substrate on which a conductive layer is formed and to which an adhesive is applied, and evaluating driving of the microcapsule layer when a voltage is applied between the transparent electrode layer and the conductive layer, the method further comprising:
    peeling and removing the peeling type resin substrate with the conductive layer before attaching the microcapsule layer to the pixel electrode surface of the rear electrode plate.

* * * * *